United States Patent
Dennis et al.

(10) Patent No.: US 7,286,994 B1
(45) Date of Patent: Oct. 23, 2007

(54) SYSTEM FOR FACILITATING TECHNICIAN SALES REFERRALS

(75) Inventors: Gary J. Dennis, Duluth, GA (US); James R. Miller, Lawrenceville, GA (US); Robert H. Willis, Louisville, KY (US); Gloria D. Perkins, Sharpsburg, GA (US); Steven G. Smith, Roswell, GA (US)

(73) Assignee: AT&T BLS Intellectual Property, Inc., Wilmington, DE (US)

(*) Notice: Subject to any disclaimer, the term of this patent is extended or adjusted under 35 U.S.C. 154(b) by 1998 days.

(21) Appl. No.: 09/746,507

(22) Filed: Dec. 26, 2000

(51) Int. Cl.
*G06Q 10/00* (2006.01)

(52) U.S. Cl. .......................................................... 705/1
(58) Field of Classification Search .................... 705/1, 705/8, 9
See application file for complete search history.

(56) References Cited

U.S. PATENT DOCUMENTS

| | | | |
|---|---|---|---|
| 4,776,016 A | | 10/1988 | Hanson |
| 4,905,163 A | * | 2/1990 | Garber et al. .................. 706/55 |
| 5,038,283 A | | 8/1991 | Cavenay |
| 5,359,649 A | | 10/1994 | Rosu et al. |
| 5,521,958 A | | 5/1996 | Selig et al. |
| 5,570,283 A | | 10/1996 | Shoolery et al. |
| 5,583,937 A | * | 12/1996 | Ullrich et al. |
| 5,623,404 A | | 4/1997 | Collins et al. |
| 5,664,110 A | | 9/1997 | Green et al. |
| 5,687,212 A | | 11/1997 | Kinser, Jr. et al. |
| 5,694,323 A | * | 12/1997 | Koropitzer et al. ......... 705/400 |
| 5,696,906 A | * | 12/1997 | Peters et al. |
| 5,754,830 A | | 5/1998 | Butts |
| 5,799,279 A | | 8/1998 | Gould |
| 5,805,775 A | | 9/1998 | Eberman |
| 5,812,977 A | | 9/1998 | Douglas |
| 5,826,270 A | * | 10/1998 | Rutkowski et al. |
| 5,848,403 A | | 12/1998 | Gabriner et al. |
| 5,857,201 A | | 1/1999 | Wright et al. |
| 5,873,070 A | | 2/1999 | Bunte |
| 5,884,262 A | | 3/1999 | Wise |

(Continued)

FOREIGN PATENT DOCUMENTS

EP   0 712 227   5/1996

(Continued)

OTHER PUBLICATIONS

No author; FieldCentrix Selects BellSouth's Intelligent Wireless Network to Bring Wireless Data Solution to Field Service Companies; Aug. 24, 1999; BusinessWire; Dialog copy pp. 1-2.*

(Continued)

*Primary Examiner*—Igor N. Borissov
(74) *Attorney, Agent, or Firm*—Withers & Keys, LLC

(57) ABSTRACT

A system for transacting business with customers is disclosed. The system includes a dispatch division receiving a complaint from a customer related to a problem the customer is experiencing. The dispatch division then deploys a technician to repair the problem. While the technician is conducting the repair, the system permits the technician to interact with the customer and negotiate and close deals for additional or modified products, services or features that the customer may want. The system also includes provisions for allowing the technician to retrieve information related to the customer and includes features that automatically notify various appropriate business offices for follow-up with the customer.

21 Claims, 2 Drawing Sheets

U.S. PATENT DOCUMENTS

| | | | |
|---|---|---|---|
| 5,896,440 | A | 4/1999 | Reed et al. |
| 5,909,492 | A | 6/1999 | Payne |
| 5,920,846 | A | 7/1999 | Storch et al. |
| 5,923,735 | A | 7/1999 | Swartz et al. |
| 5,931,917 | A | 8/1999 | Nguyen et al. |
| 5,953,389 | A | 9/1999 | Pruett |
| 5,960,411 | A | 9/1999 | Hartman et al. |
| 5,963,940 | A | 10/1999 | Liddy |
| 5,970,472 | A | 10/1999 | Allsop |
| 5,974,135 | A | 10/1999 | Breneman et al. |
| 6,023,683 | A | 2/2000 | Johnson et al. |
| 6,023,684 | A | 2/2000 | Pearson |
| 6,026,379 | A | 2/2000 | Haller et al. |
| 6,035,285 | A | 3/2000 | Schect |
| 6,052,785 | A | 4/2000 | Lin |
| 6,058,373 | A | 5/2000 | Blinn |
| 6,080,202 | A | 6/2000 | Strickland |
| 6,081,789 | A | 6/2000 | Purcell et al. |
| 6,092,192 | A | 7/2000 | Kanevsky |
| 6,101,472 | A | 8/2000 | Giangarrea et al. |
| 6,101,510 | A | 8/2000 | Stone |
| 6,115,040 | A | 9/2000 | Bladow |
| 6,115,737 | A | 9/2000 | Ely |
| 6,226,623 | B1 | 5/2001 | Schein |
| 6,233,541 | B1 | 5/2001 | Butts |
| 6,311,178 | B1 | 10/2001 | Bi |
| 6,324,522 | B2 | 11/2001 | Petersen et al. |
| 6,341,271 | B1 | 1/2002 | Salvo et al. |
| 6,366,829 | B1 | 4/2002 | Wallace et al. |
| 6,389,337 | B1 | 5/2002 | Kolls et al. |
| 6,445,774 | B1 | 9/2002 | Kidder |
| 6,473,407 | B1 | 10/2002 | Ditmer |
| 6,487,278 | B1 | 11/2002 | Skladman |
| 6,539,548 | B1 * | 3/2003 | Hendricks et al. .......... 725/109 |
| 6,578,005 | B1 | 6/2003 | Lesaint et al. |
| 6,598,167 | B2 | 7/2003 | Devine |
| 6,636,831 | B1 | 10/2003 | Profit |
| 6,671,824 | B1 | 12/2003 | Hyland |
| 6,736,376 | B1 | 5/2004 | Delisle |
| 6,738,815 | B1 | 5/2004 | Willis, Jr. |
| 2001/0016819 | A1 | 8/2001 | Kolls |
| 2002/0099642 | A1 | 7/2002 | Schwankl |
| 2002/0103906 | A1 | 8/2002 | Knight |
| 2002/0138656 | A1 | 9/2002 | Hickey |
| 2003/0023601 | A1 | 1/2003 | Fortier et al. |
| 2003/0125956 | A1 | 7/2003 | Lewis |

FOREIGN PATENT DOCUMENTS

| | | | |
|---|---|---|---|
| EP | 0 732 850 A1 * | 9/1996 | |

OTHER PUBLICATIONS

Commercial Speech Recognition, web page print (updated Oct. 25, 1989).
IBM Voice Systems, web page Apr. 17, 2001 Information Access anytime, anywhere with mobile device.
IBM Voice Systems Enterprise Voice Solutions Web Page, Apr. 17, 2001.
IBM Voice Systems Enterprise Voice Solutions—Leading Edge Technologies Web Page, Apr. 17, 2001.
Metroplex Voice Computing, Inc. Mathtalk.com, Apr. 17, 2001.
Metroplex Voice Computing, Inc. Mathtalk.com toc, Apr, 17, 2001.
Metroplex Voice Computing, Inc. Mathtalk.com upgrade to MathTalk/ScientificNotebook3, Apr. 17, 2001.
Metroplex Voice Computing, Inc. Mathtalk.com MVC Product Comparison and Product Information, Apr. 17, 2001.
Metroplex Voice Computing, Inc. Metroplexvoice.com Medical/ Legal/ Corporate Speech Recognition Solutions Packages Using L&H Dragon Naturally Speaking 5.0, Apr. 17, 2001.
Voice Recognition Systems Home Page, Apr. 17, 2001.
Lernout & Hauspie, Apr. 17, 2001.
Lernout & Hauspie, "The Language of Business", Apr. 17, 2001.
Lernout & Hauspie, "Voice Xpress", Apr. 17, 2001.
TMA Associates, Apr. 17, 2001.
TMA Associates, Editor's Notes (May 2000).
Fonix home page, Apr. 17, 2001.
Dragon Systems Inc.: Dragon Naturally Speaking Preferred Edition Alfred Poor, Apr. 17, 2007.
Nuance Verifier 2.0, Apr. 19, 2001.
Nuance Vocalizer, Apr. 19, 2001.
Nuance 7.0, Apr. 19, 2001.
Nuance home page, Apr. 19. 2001.
Nuance Powers the Voice Web, Apr. 19, 2001.
Nuance Product Offering, Apr. 19, 2001.
Nuance Voyager, Apr. 19, 2001.
Nuance Solutions, Apr. 19, 2001.
Nuance Enterprise Solutions, Apr. 29, 2001.
Nuance Telecom Solutions, Apr. 19, 2001.
Nuance Internet Solutions, Apr. 19, 2001.
Nuance Services, Apr. 19, 2001.
Nuance Speech Application Design and Development, Apr. 19, 2001.
Delivering Speech Technologies with the Fonix FAAST® Framework, Part I (a white paper), Feb. 2001.
Moran et al.; "Multimodal User Interfaces in the Open Agent Architecture", Proceedings of the 2nd International Conference on Intelligent User Interfaces, Aug. 1996.
Conversay "Speech Technology Solutions", White Paper C 2001.
"Return on Investment Model", web.archive.org webpage of Norand.com, Feb. 6, 1998, pp. 1-5.
"Norand-Payback", web.archive.org webpage of Norand.com, Feb. 6, 1998, pp. 1-2.
"Norand-Products", web.archive.org webpage of Norand.com, Feb. 6, 1998, pp. 1-5.
"Norand-Case Study", web.archive.org webpage of Norand.com, Feb. 1998, pp. 1-3.
Haugen, Dyan L.; Hill, Arthur V; "Scheduling to Improve Field Service Quality", Summer 1999, Decision Sciences, 30, 3: ABI/ INFORM Global, pp. 783-804.
Freedman, David H; "Case Study: Gas Attack", Aug. 25, 1997, Forbes ASAP Supplement, pp. 45-52, Dialog 01485548 01-36536.
McCarthy, Vince, "The Transformation of the Public Network", Mar. 20, 1995, Telephone, v228n12, pp. 88-100, Dialong 0100552196-54914.
Paz, Noemi M; Leigh, William; "Maintenance scheduling; Issues, results and research needs", 1994, International Journal of Operations & Production Management, v14n8, pp. 47-69, Dialog 00956565 96-05958.
Tseng, Paul C; Lewis, Malcom; "Best Practices and Design Tips", Apr. 1999, Contracting Business, v56, n4, p. 2s84(1), Dialog 06305741 54514903.
Jewett, Dale,: "Service Call", Jul. 21, 1997, Automotive News, p. 61, Dialog 05140584 47847132.
Southerland, Randy; "Not your typical garbagemon", Feb. 2000, Waste Age, 31, 2, ss50, Dialog 11970477 60110303.
"The Luxury Class Database", Apr. 3, 1995, InformationWeek, n 521, p. 100+, Dialong 00593604 23168942.
Ivey, Mike; "Cub: Toughen Penalties vs. Ameritech", Sep. 7, 2000, Madison Captial Times, Madison, Wisconsin, p. 1E, ProQuest ID 59714682.
Jaffe, Charles; "Gas Supplier takes timing seriously if delivers are late, the product is free". Feb. 5, 1989. The Morning Call, Allentown, PA, p. D.01, ProQuest ID 92485879.
Lister, Karen; "Improvements cited in Portland cable service", Jul. 21, 1995, Corpus Christi Caller Times, Corpus Christi, TX., Sec. B, p. 2, ProQuest 6892257.
"Norland-Field Service", web.archive.org webpage of Norand. com., Feb. 6, 1998, pp. 1-2.
"Norand-Training", web.archive.org webpage of Norand.com., Feb. 6, 1998, pp. 1-2.
Wood, Michael; "Fighting the paperwork nemesis", Mar. 1996, American Gas, v78n2, pp. 32-33, Dialog 01179245 98-28640.

"Powering better customer service. (Boston Edison implements mobile computing solution)", May 1997, Communication News, v34, 5n, p. 50(2) Dialog 02070908 19414033.

Kosseff, Jeffrey; "Service Delays May Lead to AT&T Fine". Jul. 18, 2001, The Oregonian, Portland, OR., p. C.01. ProQuest ID 75527844.

Derfler, Frank J et al, "How Networks Work", Millennium ed., Que Corp. Jan. 2000.

White, Ron, "How Computers Work", Millennium ed., Que Corp. Sep. 1999.

Gralla, Preston, "How the Internet Works", Millennium ed., Que Corp., Aug. 1999.

U.S. Appl. No. 09/343,815.

* cited by examiner

SYSTEM FOR FACILITATING TECHNICIAN SALES REFERRALS

FIELD OF THE INVENTION

The present invention is directed to a system for facilitating sales. More specifically, the present invention is directed to a system for facilitating technician sales referrals.

BACKGROUND OF THE INVENTION

Companies that operate networks provide access to their network to many different customers. These customers generally pay a fee for this access. For example, referring to FIG. 1, a customer 104 resides at dwelling 102. If the customer 104 experiences problems with their network access, resource or asset, customer 104 will contact the company 106. The customer 104's call will be handled by a customer service division 108. The customer service division will record the nature of the problem, and information related to the customer, including the customer's name, address and identification of the network asset allocated to the customer. The customer service division then contacts the dispatch division 110 which then deploys a technician 112.

While the technician 112 is at dwelling 102 repairing the problem reported by customer 104, customer 104 often asks technician 112 about other features and functions of the network. In light of these conversations, customer 104 may decide to modify his existing service and/or purchase additional features and services from company 106.

It is often very difficult or impossible for technician 112 to modify the customer's account information or provide new and additional services for customer 104 since the technician does not have all of the necessary information to properly negotiate with customer 104. Because of these difficulties, technician 112 typically refers customer 104 to the customer service division 108 of company 106. For example, the technician does not know whether customer 104 is past-due on his current bill, whether a particular service is available in the customer's area, or the exact cost for an additional or modified service. Customer 104 contacts the customer service division 108 and the customer service division 108 often refers the call to a sales division 114. Customer 104 then communicates with sales division 114 to modify existing service and to purchase additional features and services from company 106. Sales department 114 then updates the customer's account information on an account database 116.

It is inefficient and problematic that in the present system described above, technician 112 is unable to quickly and easily modify customer 104's service plan. Because technician 112 cannot assist customer 104 in modifying their service plan, customer 104 is forced to conduct a second transaction, which is disadvantageous for many reasons. For example, some customers may simply not want to bother with a second transaction with company 106 and forego the modification to their service, which often results in lost profits for company 106. Further, if customer 104 does contact company 106, the company must expend additional resources to modify the customer's account information. That is, both customer service resources as well as sales resources must be expended to complete this second transaction.

SUMMARY OF THE INVENTION

The present invention includes a system for transacting business with customers including a dispatch division receiving information related to a problem experienced by a customer. Generally, this information is relayed to the dispatch division by a customer service division that has communicated with the customer. The dispatch division deploys a technician to the customer's location in response to the information related to the problem. While the technician is at the customer's location, customers often ask the technician about other products or services offered by the company. The present invention allows technicians to receive a request from the customer for a transaction different from the original problem.

Often, in order for a technician to negotiate on behalf of the company and to provide details and pricing information of the products or services that are of interest to the customer, the technician may need to review information related to the customer, for example, customer account information. The present invention allows the technician to receive customer account information from the company over a communications network. With this information, the technician can negotiate and offer additional information to the customer and complete the sale. After the sale has been completed, the present invention also permits the technician to send either the customer's request for a product or service or information related to the sale of the product or service to the company over a communications network.

In another aspect, the communications network is a wireless network.

In another aspect, the communications network is a wire line network.

In another aspect, information related to the transaction is automatically sent by electronic mail to various parties within the company.

In another aspect, the customer's account information is automatically updated to include the transaction.

Accordingly, the present invention is directed to a system that substantially obviates one or more problems due to limitations and disadvantages of the related art.

An object of the present invention is to provide a system that facilitates sales of products or services to customers.

Another object of the present invention is to provide a system that assists technicians in selling products or services to customers.

Another object of the present invention is to provide a system that eliminates the need for customers to interact with a company multiple times to purchase a product or service.

Another object of the present invention is to provide a system that reduces or eliminates paperwork and clerical tasks.

Another object of the present invention is to provide a system that simplifies the ordering of products and services.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

DETAILED DESCRIPTION OF THE PREFERRED EMBODIMENT(S)

Figure 1:
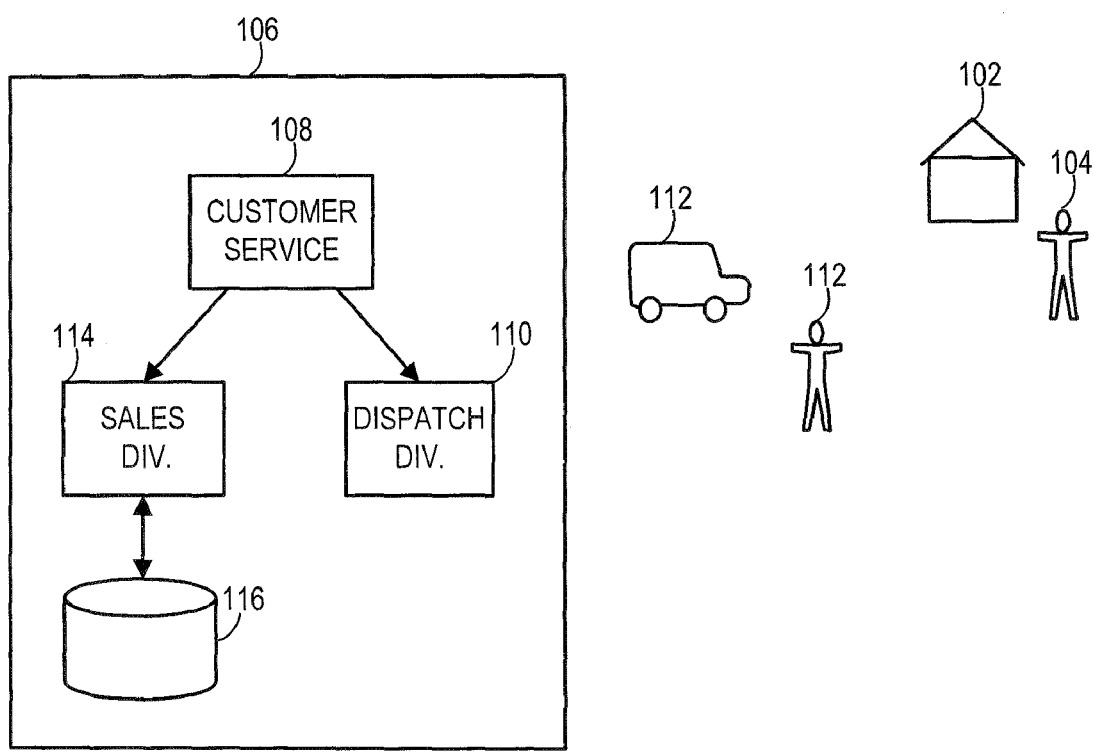
FIG. 1 is a depiction of a conventional customer service operation, according to exemplary embodiments.
Figure 2:
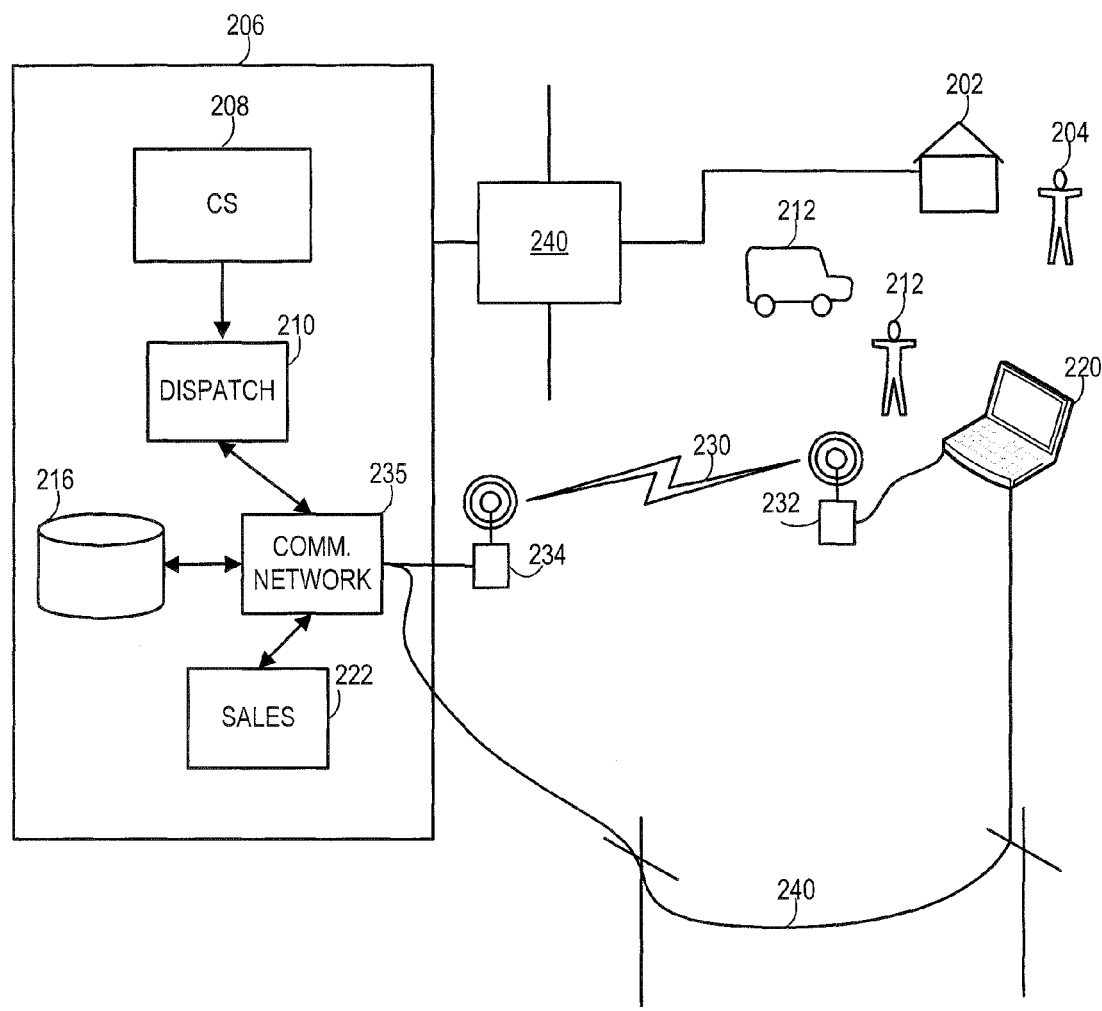
FIG. 2 is a depiction of an integrated customer service operation allowing technician customer referrals, according to exemplary embodiments.

FIG. 2 shows an embodiment of the present invention. Company 206 operates a network 240. Customer 204 subscribes to network 240 and, for example, customer 204's network resource is associated with dwelling 202. When customer 204 experiences problems with network 240, customer 204 calls company 206. Customer 204's telephone call is directed to the customer service division 208 within company 206.

A "division" is a portion of a company that performs a particular function or act. A division can be fully automated, meaning that an automated division would include only machines and/or computers. On the other hand, a division can include only human employees. A division can also include both human employees and machines and/or computers. This is the definition of "division" used in this specification and claims, unless otherwise noted.

Customer service division 208 realizes that customer 204 is experiencing problems, and after receiving information related to the complaint, customer service division 208 sends a communication to dispatch division 210. Preferably the communication is in the form of a report that provides information related to the problems experienced by customer 204. Dispatch division 210 reviews the report and dispatches a technician 212. Technician 212 travels to dwelling 202 to assist customer 204. Upon arrival, technician 212 investigates the problem and commences repairs.

Often, as described above, it is not uncommon for customer 204 to ask technician 212 about other services or features offered by network 240 while the technician 212 is at dwelling 202. In accordance with the present invention, during any such encounters, technician 212 is preferably able to inform customer 204 of various options that are available on network 240, and is preferably also able to negotiate with customer 204 regarding costs, pricing, activation fees, and other details related to the additional services or features that are of interest to customer 204. Technician 212 is preferably also able to retrieve information related to customer 204's account, including current account activity and whether customer 204 is delinquent in making payments to company 206.

In addition, technician 212 is preferably also able to order customer-desired features and services and provide information related to the order back to company 206. Generally, the information provided to customer 204 is either a receipt from company 206 acknowledging the requested feature, product or service, or a work order confirming a second task that will be performed in the future.

Company 206 and technician 212 can communicate with a system that uses a wire line communications system 240 or company 206 and technician 212 can communicate via a wireless communications system 230.

In the context of a wire line communications system, technician 212 connects to a wire line communications system 240. Preferably, wire line communications system 240 is a wire line telecommunications system. Preferably, technician 212 uses a portable computer to communicate via the wire line communications system 240. Examples of portable computers include personal data assistants and laptop computers. Preferably, a laptop computer 220 is used. Laptop computer 220 can connect directly to the wire line communications system 240 or can connect to the wire line communications system 240 through an intermediate device, for example, a modem (not shown). Preferably, technician 212 communicates with a communications division 235 at company 206.

In the context of a wireless communications system, technician 212 preferably uses the preferred laptop computer 220 connected to a communication device 232 that communicates with a second communication device 234 at the company 206. The second communication device 234 communicates with communications division 235 at company 206. The preferred wireless communications system is disclosed in U.S. patent application Ser. No. 09/343,815, entitled, "System and Methods for Utilizing a Communications Network for Providing Mobile Users Access to Legacy Systems," filed on Jun. 30, 1999, the entirety of which is incorporated by reference.

The wireless communications system does not require technician 212 to plug into an existing wire line. Technician 212 can be in communication with company 206 through the use of the wireless communications system which can include a laptop computer 212, the first communication device 232, and the second communication device 234, at any time. As shown in FIG. 2, portions of communications network 235 may reside within company 206 and be connected to various resources and divisions.

Preferably, laptop 220 includes several different ways a technician can interact with the laptop, including a keyboard, a pointer device, or a touch screen. Preferably, an application resides on laptop 220 that permits the technician 212 to complete sales or refer sales back to company 206.

Preferably, the sales referral application can be accessed at any time, regardless of whether any other applications are running on the laptop. The application preferably also permits the technician 212 to perform the following general functions: (1) cancel a sales referral form before sending; (2) transmit a sales referral form to company 206; (3) print a list of features, services and product descriptions; (4) request reports; and (5) clear data entered and/or populated on the sales referral form. Preferably the sales referral form is an electronic form that is displayed on the screen of laptop 220 and is analogous to a printed form that is used by company 206 in processing the sales referral.

While the sales referral form can include many different fields, the following fields are preferred in addition to other fields that may be used: the form title, customer contact name, customer telephone number, customer address, date, and the customer type. These fields, along with other fields on the sales referral form are preferably self-populated to the extent possible. Self-population can occur in many different ways, by having the application retrieve information from one or more sources. For example, when technician 212 logs onto the communications network 230, the application preferably can retrieve the log-in information or information related to the log-in information stored on resources connected to communications network 230. The application can also preferably retrieve customer information from resources that retain customer information. One example of such a resource is database 216 that includes customer account information, customer status information and customer profile information. Preferably, data from these resources can be transmitted via communications network 230. Either network 230 or laptop 220 preferably includes a clock and calendar. From either or both of these sources, the application can retrieve date and time information and self-populate the appropriate fields. Once the form has been self-populated to the extent possible, the self-populated data is preferably not rigidly stored, but various different fields can be overridden by the technician and the fields can be corrected by technician 212.

Preferably, the application also provides technician 212 with a list of products, services and features. The technician can access various different lists including lists for residential product services and features and commercial products, services and features. The application preferably can also automatically provide the list based on which type of customer technician 212 is currently assisting.

After technician 212 has completed the sales referral report, the application preferably stores those reports on a storage device on laptop 220 or transmits those reports via communications network 230 to company 206. The reports can also be printed by the technician. The printed reports can be given to customer 204 as confirmation of his order. The application preferably includes an "interrupt" or error-checking routine whereby the report cannot be printed until all of the required fields are completed by the technician.

The application also preferably includes full editing features such that technicians can edit any and all fields on the sales referral form.

The application can also include an e-mail feature. With this e-mail feature, after the technician has completed the sales referral report, the application can either e-mail the appropriate business division or sales division 222 that would handle the products, services or features requested by customer 204, or the application can e-mail the technician's supervisor, or the application can e-mail both the appropriate business office and the technician's supervisor. The e-mail can contain the sales referral form itself, all of the information contained on the sales referral form, or the e-mail can contain one, several, or all of the following fields of information: a subject, a date and time, the customer's name, the customer's telephone number, the customer's address, the technician's name, the technician's employee code, a maintainance center associated with the technician, the technician's supervisor, the technician's comments, response type, features, services and products requested, and customer comments on features, services or products.

In an exemplary embodiment of the present invention, network 240 is a telecommunications network and the following are some features that are available on the telecommunications network:

900 MGz DIGITAL CORDLESS TELEPHONE: A product offering which features a back-lit keypad and 50-name and number Caller ID memory. There is an available headset designed for use with this telephone, purchased separately, that allows freedom of motion while the customer is on a telephone call.

ANONYMOUS CALL REJECTION: A feature that rejects callers who block their identification.

CALL BLOCK: A feature which prevents certain numbers from getting through. Up to six (6) numbers can be rejects simultaneously. The numbers blocked may be changed by the customer.

CALL FORWARDING: A feature which allows the customer to forward telephone calls to another telephone number to avoid recording or missing calls. Calls may be forwarded to Voice Mail.

CALL FORWARDING—DON'T ANSWER WITH RING CONTROL: A feature which provides a customer with real time control over the number of seconds or ring cycles that occur prior to forwarding unanswered calls to the customer's voice mail or other telephone numbers.

CALL RETURN: A feature which automatically calls back the telephone number that last called in to the customer. This feature is available on either a per-use or monthly basis. The feature is activated by dialing "*69".

CALL SELECTOR: A feature which allows a customer to program up to six (6) different telephone numbers with a distinctive ring that identifies a call from each of those telephone numbers.

CALL TRACING: A feature which allows a customer to find out who is making annoying telephone calls.

CALL WAITING: A feature which uses a special tone to notify a customer of an incoming call when the customer is already on the phone.

CALL WAITING DELUXE: A feature which allows an incoming call to get through when the customer is already on the phone.

CALLER ID: A feature which displays the telephone number of the person calling on special display equipment before a customer answers the phone.

CALLER ID DELUXE: A feature which displays the name and telephone number of the person calling on special display equipment before a customer answers the phone.

CALLER ID ON TV: A product offering which allows a customer to see who is calling by displaying Caller ID information on the TV screen while the customer is watching television.

CUSTOMIZED CODE RESTRICTIONS—PLAN 1: A feature which blocks direct dial and operator-assisted long distance calls, directory assistance, 900, 976, and international calls.

CUSTOMIZED CODE RESTRICTIONS—PLAN 3: A feature which blocks direct dial and operator-assisted long distance calls, directory assistance, 900 calls, and international calls.

CUSTOMIZED CODE RESTRICTIONS—PLAN 4: A feature which blocks 900 and 976 calls. This feature is provided to customers at no cost when requested by the customer.

CUSTOMIZED CODE RESTRICTIONS—PLAN 6: A feature which blocks 900, 976 and N11 (the special-purpose three-digit telephone number such as 911 or 411) calls. This feature is provided to customers at no cost when requested by the customer.

FLEXIBLE CALL FORWARDING: A feature which allows a customer to change the place calls are forwarded, from any telephone, any time, anywhere, even to a cellular telephone.

FLEXIBLE CALL FORWARDING PLUS: A feature which has all of the benefits of regular Flexible Call Forwarding plus the added benefit of a separate dial-around number which always rings at the customer's primary telephone even though the primary number is forwarded.

FLEXIBLE CALL FORWARDING PLUS WITH AUDIO CALLING: A feature which allows a customer to direct calls to alternate telephone numbers like pagers, cellular telephones, a voice mailbox, or any other telephone number where the customer wants to be reached.

NAME: This feature provides a separate dial-around number which always rings at the customer's primary telephone number even though the primary number is forwarded. It announces the name of the person calling at the forwarded location before the customer accepts the call.

FLEXIBLE CALL FORWARDING WITH AUDIO CALLING NAME: A feature which allows a customer to direct calls to alternate telephone numbers like pagers, cellular telephones, a voice mailbox, or any other the telephone number where the customer wants to be reached. This feature announces the name of the person calling at the forwarded location before the customer accepts the call.

HEADSET FOR CORDLESS AND WIRELESS TELEPHONES: A product offering which can be used with a cordless or wireless telephone to allow an individual to use a cordless or wireless telephone, hands-free, while walking around a house or office, or while driving.

IDP: Overrides Office Dialing Plan (ODP) for feature codes, private facility access codes, intercom dial codes, DPAT (Dialing Plan Access Treatment) for respective features/facility groups.

ISDN: A service offering which combines both analog and digital access to the telephone network. Provides various communications such as voice, facsimile, data communications and image transmission by means of digital transmission, and enhanced services such as Calling Line ID.

MLHG: A standard service offering consisting of multiple telephone lines which have the feature of rolling calls over to each other under certain conditions such a line busy or ring, no answer.

POWERTOUCH 350 SCREEN PHONE: A product offering which allows a customer to see who is calling on the large Caller ID screen, then with a single touch (1) answer the call, (2) forward the call to voice mail, or (3) deliver a "please hold" message to the caller.

PREFERRED CALL FORWARDING: A feature which forwards only select calls to another telephone number.

P/SIMS: A proprietary system which provides available features and packages on available switches.

REMOTE ACCESS TO CALL FORWARDING: A feature which allows a customer to stop call forwarding or re-route forwarded calls from any touch-tone telephone.

REPEAT DIALING: A feature which redials a busy number and informs the customer when the number is reached. This feature is available on a per-use or monthly basis.

RIGHTTOUCH® SERVICES: An automated system that allows residential customer to quickly find out the amount of the last bill, the date the last payment was received, and/or request a copy of the last bill. RightTouch® can be used to order calling services, local telephone directories, a calling card, suspend service, restore service, disconnect service, and get information and help on how to use telephone services.

RINGMASTER® SERVICE-1 ADDITIONAL TELEPHONE NUMBER: A feature which allows a customer to have one additional telephone number with its own distinctive ring on the customer's existing line.

RINGMASTER® SERVICE-2 ADDITIONAL TELEPHONE NUMBERS: A feature which allow a customer to have two additional telephone numbers with their own distinctive ringing patterns on the customer's existing line.

SPEED CALLING 30: A feature which allow a customer to program up to 30 telephone numbers for quick dialing.

SPEED CALLING 8: A feature which allows a customer to program up to six (6) telephone numbers for quick dialing.

These are just a number of features, products, and services that can be offered in accordance with the principles of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto and by their equivalents.

We claim:

1. A system for transacting business comprising:
   a dispatch division for receiving information related to a problem experienced by a customer and for deploying a technician to a location requested by the customer in response to the information,
   a computer accessible by the technician at the location requested by the customer that includes instructions that initiate a communication with the company via a telecommunications network when the technician receives a request from the customer for a transaction different from the problem and enters an identity of the customer in the computer, the computer further comprising:
   instructions that submit the identity of the customer in the initiated communication, instructions that receive customer information including customer payment delinquency information, and a customer type via the telecommunications network in response to the submission, the customer type comprising a network resource provided by the telecommunications network associated with a customer dwelling,
   instructions that select one or more items corresponding to the received customer type from a set of items, the set of items comprising residential product services, residential product features, commercial services, and commercial features in the telecommunications network,
   instructions that automatically provide a list of the one or more selected items, instructions that receive a selection corresponding to the received request from the customer from the one or more items, and
   instructions that communicate the received selection corresponding to the received request from the customer to the dispatch division over the telecommunications network.

2. The system according to claim 1, wherein the company receives the request and automatically processes the request and modifies the customer's account information.

3. The system according to claim 1, wherein the telecommunications network is wireless.

4. The system according to claim 1, wherein the telecommunications network is wire line.

5. The system according to claim 1, wherein information related to the transaction is automatically sent by electronic email to the technician's supervisor.

6. The system according to claim 1, wherein information related to the transaction is automatically sent by electronic email to a sales division.

7. The system according to claim 1, wherein the transaction includes the sale of a service.

8. The system according to claim 1, wherein the transaction includes the sale of a product.

9. The system according to claim 1, wherein the customer information is automatically updated to include the transaction.

10. The system according to claim 1, wherein the customer information includes customer account information.

11. A method for transacting business comprising:
    receiving information related to a problem experienced by a customer;
    deploying a technician to a location requested by the customer in response to the information, wherein the technician is employed by a company which provides services to the customer;
    initiating a communication with the company over a telecommunications network by the technician by accessing a computer at the location requested by the customer when the technician receives a request from the customer for a transaction different from the problem, the communication including a submission of an identity of the customer;

sending, in response to the communication, customer information to the computer in use by the technician via the telecommunications network from the company in response to the communication from the technician, wherein the customer information includes customer payment delinquency information and a customer type, the customer type comprising a network resource provided by the telecommunications network associated with a customer dwelling;

selecting by the computer one or more items corresponding to the customer type from a set of items, the set of items comprising residential product services, residential product features, commercial services, and commercial features in the telecommunications network;

providing automatically, by the computer, a list of the one or more selected items;

receiving at the computer a selection from the list; and communicating the received selection to the dispatch division from the computer over the telecommunications network.

12. The method according to claim 11, wherein the telecommunications network is a wireless communications network.

13. The method according to claim 11, wherein the telecommunications network is a wire line communications network.

14. The method according to claim 11, further comprising sending an electronic mail message to the supervisor of the technician, wherein the electronic mail message includes information related to the transaction.

15. The method according to claim 11, further comprising sending an electronic mail message to a sales division, wherein the electronic mail message includes information related to the transaction.

16. The method according to claim 11, wherein the transaction includes the sale of service.

17. The method according to claim 11, wherein the transaction includes the sale of a product.

18. The method according to claim 11, further comprising automatically updating the customer information with information related to the transaction.

19. The method according to claim 11, wherein the customer information includes customer account information.

20. The system according to claim 1, wherein the computer is configured to populate an electronic sales form with the received customer information and the received selection and communicate the electronic sales form to the dispatch division, and wherein at least one field associated with the electronic sales form is self-populated.

21. The method according to claim 11, further comprising:

populating an electronic sales form with the received customer information and the received selection, wherein at least one field associated with the electronic sales form is self-populated; and communicating the electronic sales form to the dispatch division.

* * * * *